United States Patent
L'Heureux et al.

(10) Patent No.: US 6,697,942 B1
(45) Date of Patent: Feb. 24, 2004

(54) METHOD FOR REMOTELY MANAGING A REMOTE DEVICE USING AN ELECTRONIC MAIL MESSAGE

(75) Inventors: David L'Heureux, San Carlos, CA (US); Craig Hackerd, Gilroy, CA (US)

(73) Assignee: Earthlink, Inc., Atlanta, GA (US)

( * ) Notice: Subject to any disclaimer, the term of this patent is extended or adjusted under 35 U.S.C. 154(b) by 0 days.

(21) Appl. No.: 09/411,586

(22) Filed: Oct. 1, 1999

Related U.S. Application Data

(60) Provisional application No. 60/118,639, filed on Feb. 4, 1999.

(51) Int. Cl.[7] .......................... G06F 9/445; G06F 13/10; G06F 15/16
(52) U.S. Cl. ........................ 713/152; 713/168; 713/170; 713/178; 713/201; 709/206; 709/238; 380/238; 380/285
(58) Field of Search ................................ 380/283, 285; 713/168, 170, 178, 201; 709/206, 238

(56) References Cited

U.S. PATENT DOCUMENTS

| | | | | |
|---|---|---|---|---|
| 5,748,084 A | * | 5/1998 | Isikoff | 340/568.1 |
| 5,826,062 A | | 10/1998 | Fake, Jr. et al. | |
| 5,949,976 A | * | 9/1999 | Chappelle | 709/224 |
| 5,958,005 A | | 9/1999 | Thorne et al. | |
| 6,006,328 A | * | 12/1999 | Drake | 713/200 |
| 6,014,688 A | | 1/2000 | Venkatraman et al. | |
| 6,014,689 A | * | 1/2000 | Budge et al. | 709/206 |
| 6,070,150 A | * | 5/2000 | Remington et al. | 705/34 |
| 6,105,056 A | * | 8/2000 | Gilchrist | 709/206 |
| 6,118,856 A | * | 9/2000 | Paarsmarkt et al. | 379/93.24 |
| 6,141,695 A | * | 10/2000 | Sekiguchi et al. | 709/246 |
| 6,161,130 A | * | 12/2000 | Horvitz et al. | 709/206 |
| 6,192,518 B1 | * | 2/2001 | Neal | 717/11 |
| 6,264,562 B1 | * | 7/2001 | McSheffrey et al. | 463/42 |
| 6,408,328 B1 | * | 6/2002 | Haury | 709/207 |
| 6,424,424 B1 | * | 7/2002 | Lomas et al. | 358/1.14 |

OTHER PUBLICATIONS

"Real" Mail user interface for in Basket, IBM Technical Disclosurer Bulletin, vol. 31, No. 10, pp. 171–172, Mar. 1989.*

Engagnet, Engagnet Domain Inventory Deployment Options, www.engagnet.com/Products/Snow/Inventory/docs/EngagentDomainInventoryDeploymentOptions.pdf, 2000–20001.*

* cited by examiner

Primary Examiner—Ayaz Sheikh
Assistant Examiner—Taghi Arani
(74) Attorney, Agent, or Firm—Akin, Gump, Strauss, Hauer & Feld, L.L.P.

(57) ABSTRACT

A data formatting method for embedding diverse data types in an electronic mail message includes the step of forming a network compliant electronic mail message header. Command blocks representing diverse data types are also generated. The command blocks representing the diverse data types are combined with a network compliant electronic mail message header into an electronic mail message. The electronic mail message is constructed to conform to network standards such that the command blocks representing the diverse data types are processed as textual information.

16 Claims, 10 Drawing Sheets

Data Types

| Type | Sub-Type | Syntax | Function |
|---|---|---|---|
| x-clipmail | text | x-clipmail/text | identify a command block |
| x-clipmail | x-bitmap | x-clipmail/x-bitmap | identify a bitmap data block |
| x-clipmail | x-binary | x-clipmail/x-binary | identify a binary code data block |
| x-clipmail | x-form | x-clipmail/x-form | identify a form data block |
| text | plain | text/plain | text for in-box/screen messages |

Fig. 5

Global Commands

| Command | Syntax | Function |
|---|---|---|
| SET_ACTIVE_USER | SET_ACTIVE_USER=[up to 24 CHAR] | selects active e-mail account |
| SET_DATE | SET_DATE=[NUMs] | set current calendar date of DET |
| SET_TIME | SET_TIME=[HHMM] | set current time on DET |
| GLOBAL_COLOR_TABLE | GLOBAL_COLOR_TABLE = ( BITDEPTH, RGB LIST ) | sets color table used by the DET |
| DET_VERS_REQUIRE | DET_VERS_REQUIRE=[NUM.NUM] | set minimum version required by DET |
| EXPIRE_DATE | EXPIRE_DATE=[8 NUMs] | sets expiration date of message |
| SECURITY_KEY | SECURITY_KEY=[up to 18 CHARs or NUMs] | security key set by sender |

Fig. 6

Internet Commands

| Command | Syntax | Function |
|---|---|---|
| SET_USER_NAME | SET_USER_NAME=[up to 64 CHAR] | sets/changes user name |
| SET_EMAIL_ACCOUNT | SET_EMAIL_ACCOUNT=[up to 64 CHARs] | sets/changes e-mail account name |
| DELETE_EMAIL_ACCOUNT | DELETE_EMAIL_ACCOUNT=[up to 64 CHARs] | deletes e-mail account name |
| SET_EMAIL_PASSWORD | SET_EMAIL_PASSWORD=[up to 24 CHARS] | sets/changes e-mail account password |
| SET_EMAIL_SERVER | SET_EMAIL_SERVER=[up to 24 CHARS] | sets/changes POP3 server name |
| SET_SMTP_SERVER | SET_SMTP_SERVER=[up to 24 CHARs] | sets/changes SMTP server name |
| SET_ISP_ACCOUNT | SET_ISP_ACCOUNT=[up to 24 CHARs] | sets/changes ISP/PPP account name |
| SET_ISP_PASSWORD | SET_ISP_PASSWORD=[up to 24 CHARs/NUMs] | sets/changes ISP/PPP password |
| SET_DNS_SERVER | SET_DNS_SERVER=[15 NUMs/PERIOD] | sets/changes the DNS information |
| SET_DIAL_NUMBER | SET_DIAL_NUMBER=[up to 24 CHARs] | sets/changes PPP dial-up number |

Fig. 7

| \multicolumn{3}{c}{Address Book Commands} | | |
|---|---|---|
| Command | Syntax | Function |
| NEW_ADDRESS_ENTRY | NEW_ADDRESS_ENTRY={<br>GROUP=[up to 24 CHARs];<br>FIRST_NAME=[up to 24 CHARs];<br>LAST_NAME=[up to 24 CHARs];<br>EMAIL_ADDRESS=[up to 24 CHARs];<br>FAX=[up to 24 CHARs/NUMs];<br>HOME_PHONE=[up to 24 CHARs/NUMs];<br>OFFICE_PHONE=[up to 24 CHARs/NUMs];<br>MOBILE_PHONE=[up to 24 CHARs/NUMs];<br>PAGER=[up tp 24 CHARs/NUMs];<br>OTHER=[up tp 24 CHARs/NUMs];<br>} | adds/changes entry in address book |
| NEW_GROUP_ENTRY | NEW_GROUP_ENTRY=[up to 24 CHARs] | creates a new group |

Fig. 8

| \multicolumn{3}{c}{Calendar Commands} | | |
|---|---|---|
| Command | Syntax | Function |
| NEW_CALENDAR_ENTRY | NEW_CALENDAR_ENTRY={<br>DATE=[YYYYMMDD];<br>START_TIME=[4 NUMs];<br>END_TIME=[4 NUMs];<br>TEXT="[up to 64 CHARs/NUMs]";<br>} | adds/changes entry in calendar |

Fig. 9

| Bitmap Commands | | |
|---|---|---|
| Command | Syntax | Function |
| BITMAP_RECT | BITMAP_RECT = {<br>TOP, LEFT, BOTTOM, RIGHT<br>} | sets location/size of an image |
| BITMAP_STORE | BITMAP_STORE = { CONSTANT } | sets predefined storage option |
| BITMAP_DEPTH | BITMAP_DEPTH = {DEPTH} | sets depth of image bitmap |
| BITMAP_COLOR_TABLE | BITMAP_COLOR_TABLE = {<br>BITDEPTH,<br>RGB LIST<br>} | sets color table used by DET in bitmap data blocks |
| BITMAP_STORE_ICON | BITMAP_STORE_ICON = {CONSTANT} | associates new icon in extras section |

Fig. 10

Form Commands

| Command | Syntax | Function |
|---|---|---|
| FORMNAME | FORMNAME = { TEXT } | identifies type of form to use |
| SUBJECT | SUBJECT = { TEXT } | defines response message appearence |
| REPLY-TO | REPLY = {[INTERNET MAIL ADDRESS]} | defines response target e-mail address |
| TEXT | TEXT = {LABEL, TOP, LEFT } | form text appearing on DET screen |
| CHECK_BOX | CHECK_BOX = {<br>LABEL, TOP, LEFT, DEFAULT<br>} | indicates a check box to be drawn |
| FIELD | FIELD = {<br>LABEL,<br>TOP,<br>LEFT,<br>WIDTH,<br>DEFAULT,<br>REQUIRED<br>} | indicates size/location of data input field |
| POPUP_MENU | POPUP_MENU= {<br>LABEL,<br>CHOICES,<br>DEFAULT,<br>TOP,<br>LEFT,<br>[LABELWIDTH]<br>} | indicates check box drawn inside bitmap |

Fig. 11

```
                                                                    400
                                                                ╱
                415
         420   ╱
   425 ╲  ╲  From: ClipMail <ClipMail@Cidco.com>
              To: Joe User <Joe_User@DETMail.com>                 410
   430        Date: Mon, 4 Jan 1999 09:41:09 -0800 (PST)         ╱
   435        Subject: You've Got to Read This!
              MIME-Version: 1.0
   440        Content-Type: multipart/mixed; boundary=new_segment 460 ──── --new_segment
   463 ──── Content-Type: x-clipmail/text: text/plain; charset=us-ascii
   466 ──── X-ClipMail-Security_Key: ev4GCAnIkiI9417KZg9v1/f+SYMrfkJb 469 ──── / ClipMail Commands go here: see command summary for complete list /

460 ──── --new_segment
   470 ──── Content-Type: x-clipmail/x-bitmap
   472 ╲    BITMAP_RECT={0,0,320,128}
   473 ──── / Bitmap data goes here /
                                                                 450
   460 ──── --new_segment
   476 ──── Content-Type: x-clipmail/x-form
   479 ╲
   483 ──── FORMNAME = Registration
   486 ──── SUBJECT=Registration Request Form
          ── REPLY-TO=registrar@cidco.com
   489 ──── FIELD = {Name:, 10, 6, 150,, YES, 60}
   490 ──── FIELD = {Address:, 30, 6, 150,, NO, 60}
     492 ── FIELD = {EMail:, 50, 6, 150, user@domain.com, YES, 60}
   460 ──── --new_segment
   494 ──── Content-Type: text/plain; charset=us-ascii ╱ / Message text for a message to be displayed in the user's In Box goes here /
   496

Fig. 12
```

METHOD FOR REMOTELY MANAGING A REMOTE DEVICE USING AN ELECTRONIC MAIL MESSAGE

This application claims priority to the provisional patent application entitled "Apparatus and Method for Utilizing Standard Electronic Mail to Transport Diverse Data Content," Ser. No. 60/118,639, filed Feb. 4, 1999.

BRIEF DESCRIPTION OF THE INVENTION

This invention relates generally to electronic communication systems. More particularly, this invention relates to a technique for processing diverse data within standard electronic mail (e-mail) messages.

BACKGROUND OF THE INVENTION

Over the past thirty years electronic communication has made rapid and significant advances. In the 1960s the primary use of such communications systems was to share information among geographically distributed research teams. Typically this was accomplished via networks such as the Advanced Research Projects Agency Network (ARPANET) using a teletype and acoustic modems. This network tied together universities, government agencies and businesses, and was the forerunner of the worldwide web, or Internet, as it exists today. The information exchanged was typically in the form of text.

The early 1970s saw businesses begin to develop internal networks, or intranets. These systems were characterized by desktop terminals giving remote users the ability to generate and send e-mail to individuals inside the organization. Although the distribution was limited to those inside the organization it greatly increased the communications efficiency within the company.

During the same period the PC, or personal computer, began to appear in larger numbers. These devices allowed a relatively inexpensive system for connecting to networks, greatly increasing the ability to share information. By the late 1970s PCs were becoming commonplace and, accompanied by advances in peripheral electronics such as hard-wired modems, fast reliable connection to networks became possible. In the early to mid 1980s the PC was becoming a household appliance and by the late 1980s a PC could be purchased inexpensively, making it a consumer commodity much like a VCR or television set. Private users could connect to the increasing number of sites available on the developing Internet from their homes via the public telephone network.

One result of the commoditization of the PC was a large increase in the volume of e-mail. Using commercially available software in tandem with the burgeoning Internet and associated service providers, PC users could establish individual e-mail accounts. As a result, in 1998 over three trillion messages were exchanged by e-mail in the United States. It is estimated that by the year 2001 there will be 80 million e-mail users in the United States alone. Globally the number is increasing dramatically as well.

Fueled by factors such as the commoditization of PCs, the proliferation of the Internet, and the expansion in electronic communications services, a need for standards became evident. Several standards were developed and continue in use. Examples of these standards include ARPA specifications RFC-821 and RFC-822, Simple Mail Transfer Protocol (SMTP), Post Office Protocol (POP), and the Multipurpose Internet Mail Extension (MIME) specifications RFC-2045 through RFC 2049. The SMTP, POP, and MIME specifications are the major standards in use at the present time.

However, standards alone present only part of the picture. Demands by the user population for ease of use plus competition for users led to the expansion of the number of providers and the services they offered. The combination of plug-and-play technology for both hardware and software plus the standards mentioned above resulted in inter-platform compatibility for e-mail services. More recently, telephone service providers, or the so-called Baby Bells, have entered the e-mail provider marketplace, expanding the competition and further driving advances in e-mail services.

Indicative of the expanded services offered by telephone service providers is the transmission of text data as part of a Dual Tone Multi-Frequency (DTMF) signal. The service provider assembles a text message as a series of DTMF characters, sends those characters over the normal telephony channel, where the user's equipment interprets and displays the characters as a text message. In another example, both the service provider and third parties, such as news services, cooperate to automatically assemble an e-mail message that is personalized to the user's needs. In this instance, the message is received by the user's equipment and is displayed as a standard e-mail message. Both of these expanded uses, however, are restricted to simple text messages and thus suffer from the inability to transmit diverse types of data content.

There is a need to transmit more than simple text messages to users of current communications devices. Such services as remote programming or problem solving, remote system verification, user interactive forms and device synchronization are examples of the type of information that would be useful. Each of these more advanced services requires a richer data palette for supporting user requirements mandating more than simple text message content. For example, the service provider or a third party may wish to transmit a graphic image or an application program. Obviously, contemporary methods that send only simple text messages will not satisfy this need.

While there are contemporary examples of remote manipulation of devices, this is typically done via dedicated lines and involves operator or user intervention. An example of such a service is the ability to reconfigure a remote telephone device such as a Customer Premises Equipment (CPE) via Frequency Shift Keying (FSK) over standard phone lines. The method involves compiling a series of receiving apparatus commands at a central service provider site, then sending the commands to the CPE. The disadvantage of this methodology is that it is restricted to commands only, and does not have the simultaneous capability to send standard text messages, graphic images or user interactive forms. Thus this method also suffers from the inability to simultaneously transmit multiple types of data to a remote device.

It would be desirable to provide a method for using an e-mail message to send multiple types of data. Such diverse data could include standard text messages, program code, graphic images, user interactive forms or remote configuration commands. It would be further desirable to use the existing e-mail standards such that no special user equipment would be needed to take advantage of the diverse data content of the incoming e-mail message. A further desirable feature would be the ability to provide automatic updates to user equipment without the need for user intervention. It would also be desirable to provide a reasonably secure transaction environment such that both the user and the sender of e-mail messages could be assured that information in the message would not be compromised. At the present time no method exists which simultaneously accomplishes all of these desirable features.

SUMMARY OF THE INVENTION

The present invention describes a data formatting method for embedding diverse data types in an electronic mail message by forming a network compliant e-mail message header, generating one or more command blocks representing diverse data types, and combining the data types with the message header such that the e-mail message conforms to network standards. In operation, data are edited on and sent from a first system, for example, a subscriber service center, by means of a set of custom message commands. The editing system at the sender's location employs a Graphical User Interface (GUI) enabling non-sophisticated users to create complex mixed data type messages. The mixed data type message may contain commands to reset the configuration of a remote device, for example to change a password or update a device setting. Additionally, other segments, or blocks of the message may contain a graphic image and/or a plain text message. The exact nature of the data depends upon predefined data types.

At the sender's location the mixed data type message is passed from the graphical user interface to a command formatter which translates the GUI output into a custom command format suitable for the receiving apparatus to interpret. A standard e-mail header is then formed and the two parts of the message are combined into e-mail format for transmission. Once in the proper format, the e-mail message may be transferred over standard e-mail networks using standard e-mail protocols. For example, an e-mail message may be sent over the Internet to a SMTP server using SMTP/MIME protocols. From the SMTP server the message is transferred to the recipient's POP server where it is stored until the recipient downloads it during an e-mail session.

Upon receipt at the user's location, and depending upon the content of the data in the e-mail message, the memory apparatus in the receiving device parses the message into segments, decrypts the security code, identifies the data type within each segment, processes the data and executes the resultant commands upon the device. The remote device may either simply store the message for later display by the user or may automatically execute all or a portion of the embedded code contained in the e-mail message. In the case where the e-mail message does not automatically execute, the recipient may retrieve the message and interact with it. For example, where the message contains a data type representing a user form, the user may display the form, interact with it, and return the form to the sender. In a similar fashion, where the message contains a data type representing a graphical image, the user may retrieve the image and display it.

There are a number of advantages associated with the invention. First, the invention extends the MIME protocol, thereby providing the ability to transmit diverse data types in a single network standard e-mail format. A second advantage of the present invention is the ability to update a remote device using standard e-mail protocols. A third advantage of the present invention is the use of a dynamic security key, which eliminates any messages from unwanted senders for example, so called "spam" mail.

BRIEF DESCRIPTION OF THE DRAWINGS

FIG. 5 illustrates embedded data message data types that may be utilized in accordance with one embodiment of the present invention.

FIG. 6 illustrates embedded data message global commands that may be utilized in accordance with one embodiment of the present invention.

FIG. 7 illustrates embedded data message Internet commands that may be utilized in accordance with one embodiment of the present invention.

FIG. 8 illustrates embedded data message address book commands that may be utilized in accordance with one embodiment of the present invention.

FIG. 9 illustrates embedded data message calendar commands that may be utilized in accordance with one embodiment of the present invention.

FIG. 10 illustrates embedded data message image bitmap commands that may be utilized in accordance with one embodiment of the present invention.

FIG. 11 illustrates embedded data message form commands that may be utilized in accordance with one embodiment of the present invention.

FIG. 12 is a detailed example of a message containing diverse embedded data implemented by the method of the present invention.

DETAILED DESCRIPTION OF PREFERRED EMBODIMENTS

The present invention provides a method for using standard e-mail messages to deliver diverse data types to a user. Such diverse data includes application programs, graphic images, standard text, user interactive forms, and configuration data, to name a few. The invention further allows automatic updates to a user's equipment using a standard e-mail message. The present invention also provides a reasonable level of security for the diverse data contained in an e-mail message. The method of the present invention provides a technique for editing diverse data types, a method for formatting the diverse types of data into an e-mail message including the formation of a standard e-mail header, and a method for interpreting the various types of data at the user's remote device. The editing means may be any device that has the ability to generate and edit standard text, typically a PC or workstation. In one embodiment of the present invention, this editing means further utilizes a graphical user interface to allow non-skilled persons to rapidly generate diverse data types without the need for specialized programming knowledge.

The remote receiver may be any device capable of receiving standard e-mail, such as a PC or a dedicated telephone device with e-mail capability and containing a memory apparatus capable of directing a digital device to properly parse, identify, process and execute the embedded diverse data. As will be detailed below, numerous advantages to the present invention are described which extend the usefulness of existing standards in non-trivial ways.

Figure 1:
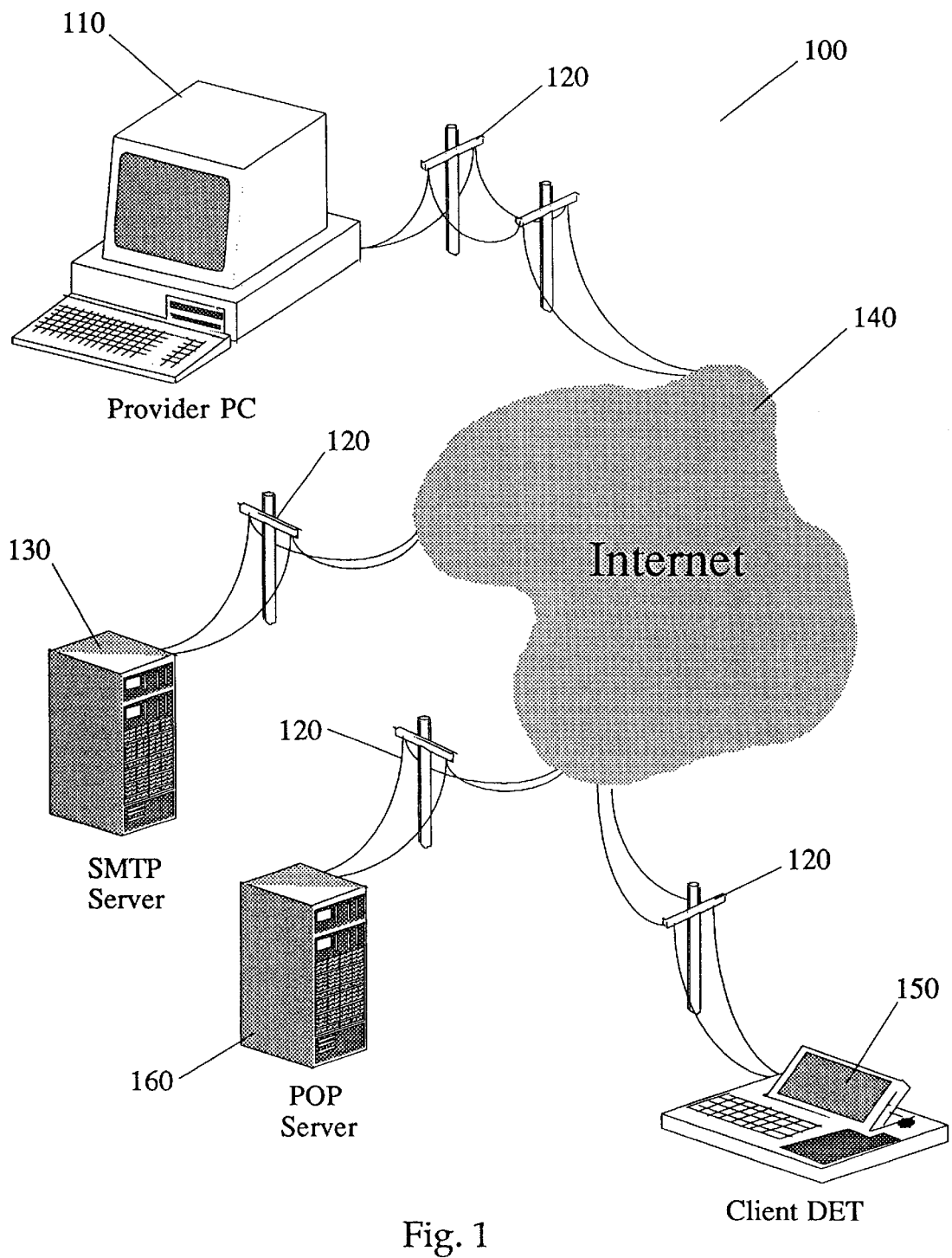
FIG. 1 illustrates a system that may be utilized in accordance with an embodiment of the present invention.

For a more complete understanding of the method of the present invention, it is necessary to first describe the environment in which the invention operates. Referring to FIG. 1, a high level block diagram 100 of a typical system used in conjunction with the method of the present invention is shown. An editing terminal 110, for example a desktop personal computer, is used to compose e-mail messages containing the diverse data that are the subject of the present invention. The message is sent, or uploaded, via the Internet 140, for example, by land lines 120, to an SMTP server 130. The SMTP server 130 relays the uploaded message to the recipient's POP server 160. Note that both the SMTP server 130 and the POP server 160 may be co-located or, as shown in the example in FIG. 1, may be remote from each other. This is so since the sender and recipient of the e-mail message may use different e-mail service providers, or so-called Internet Service Providers (ISPs). Once the e-mail message has been transferred to the POP server 160, it is stored there until the recipient logs on for an e-mail session.

An e-mail recipient requests their e-mail from the POP server 160 through a remote client device, in this example a Desktop E-mail Terminal [DET] 150. Upon receiving the request for service, the POP server 160 transfers, or downloads the e-mail message to the DET 150. It is important to note that the general method described above is one way of moving an e-mail message from a sender to a recipient. As is known to those skilled in the art, there are other methods that will also work. Since the transport method is not a part of the invention disclosed, a detailed discussion of the precise method is not warranted, nor are the claims limited to just the method generally described.

Figure 2:
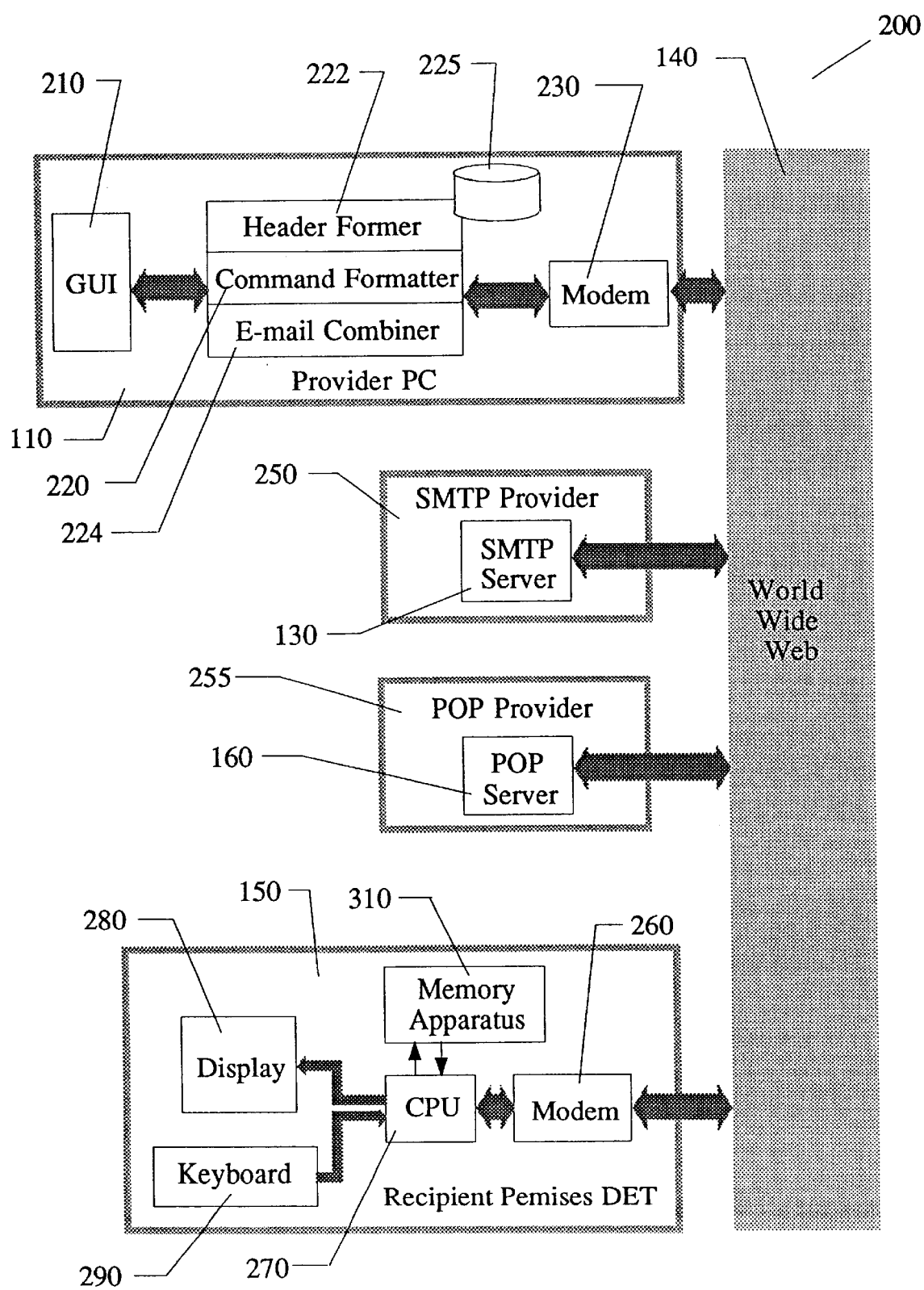
FIG. 2 is a high level block diagram of a system that may be utilized in accordance with one embodiment of the present invention.

FIG. 2 is a more detailed block diagram 200 of the method of the present invention. The editing terminal 110, for example, a PC at a service providers location, contains the GUI interface software 210, command formatter 220, header former 222, e-mail combiner 224 and a modem 230. Together the GUI interface in combination with the command formatter, header former and e-mail combiner modules form a custom set of software tools specifically written to implement the present invention. Particular to these software tools are a set of commands, appearing in FIG. 6 through FIG. 9, and described in detail below, which allow an e-mail message to be generated containing diverse types of data in a form capable of being transmitted over existing networks using standard e-mail protocols that can be received by existing e-mail devices.

The GUI software 210 provides a non-skilled user with the ability to construct a complex message containing multiple data types by checking boxes, selecting from pop-up menus, painting with conventional bitmap editing tools, and laying out forms with graphical tools, all methods well known to those skilled in the art. Although the GUI software of the present invention is not a requirement for constructing multiple data-type messages, one distinct advantage is its ease of use, accommodating those not skilled in software art. Thus, it is possible to construct a message by "hand" using a common text editor, for example a word processor, but it would be very difficult since the invention utilizes a dynamic security key which must be calculated and further, any graphical image to be embedded would have to be crafted bit by bit using the text editor.

Output from the GUI software 210 is submitted to the command formatter 220, which takes the contents of the user interface session input and generates multiple data-type commands capable of being interpreted by the remote user's device. The header former 222 forms a network compliant message header and both the commands and the header are combined by the e-mail combiner 224 and written to message file 225. This file conforms to the Multipurpose Internet Mail Extension (MIME) format set forth in RFC-2045 through 2049 and RFC-821 and 822 ARPA Internet Text Messages. The message is then transmitted via the Internet 140 by the modem 230 by means well known to those skilled in the art.

Continuing with FIG. 2, the SMTP server 130, which in this example is operated at a remote site by an e-mail service provider 250, receives the e-mail message from the editing terminal 110. The SMTP server 130 then transfers the e-mail message to the target recipient's POP server 160. As with the SMTP server 130, the POP server 160 in this example is operated remotely from both the sender of the e-mail message and the target recipient, in this case by a second e-mail service provider 255. But, as will be recognized by those skilled in the art, these servers need not be operated remotely in order to conform to the method of the present invention.

The next time the target recipient logs into the POP server 160 for an e-mail session, the e-mail message will be downloaded in the customary manner. Depending on the data type content of the e-mail message, a number of different actions may occur, as explained in detail below. But by way of example, if the incoming e-mail message to the target recipient's premises DET 150 contains no data of the type text/plain, any command blocks embedded in the message will automatically execute. If such text/plain data type is present, the e-mail message is stored in the premises DET's local memory 310, customarily in an area referred to as an e-mail "in-box", for the recipient to act upon.

The recipient's premises DET device 150, also shown in greater detail in FIG. 2, receives the e-mail message via modem 260 under the control of the CPU 270. The recipient then uses the keyboard 290 in conjunction with the display 280 to retrieve the e-mail from memory 310, then view and/or respond to the message. Alternatively, as was described above, if the diverse data in the e-mail message contains commands that are to be automatically invoked, for example, setting the time and date on the premises DET 150, the CPU 270 executes the commands without intervention by the user.

Figure 3:
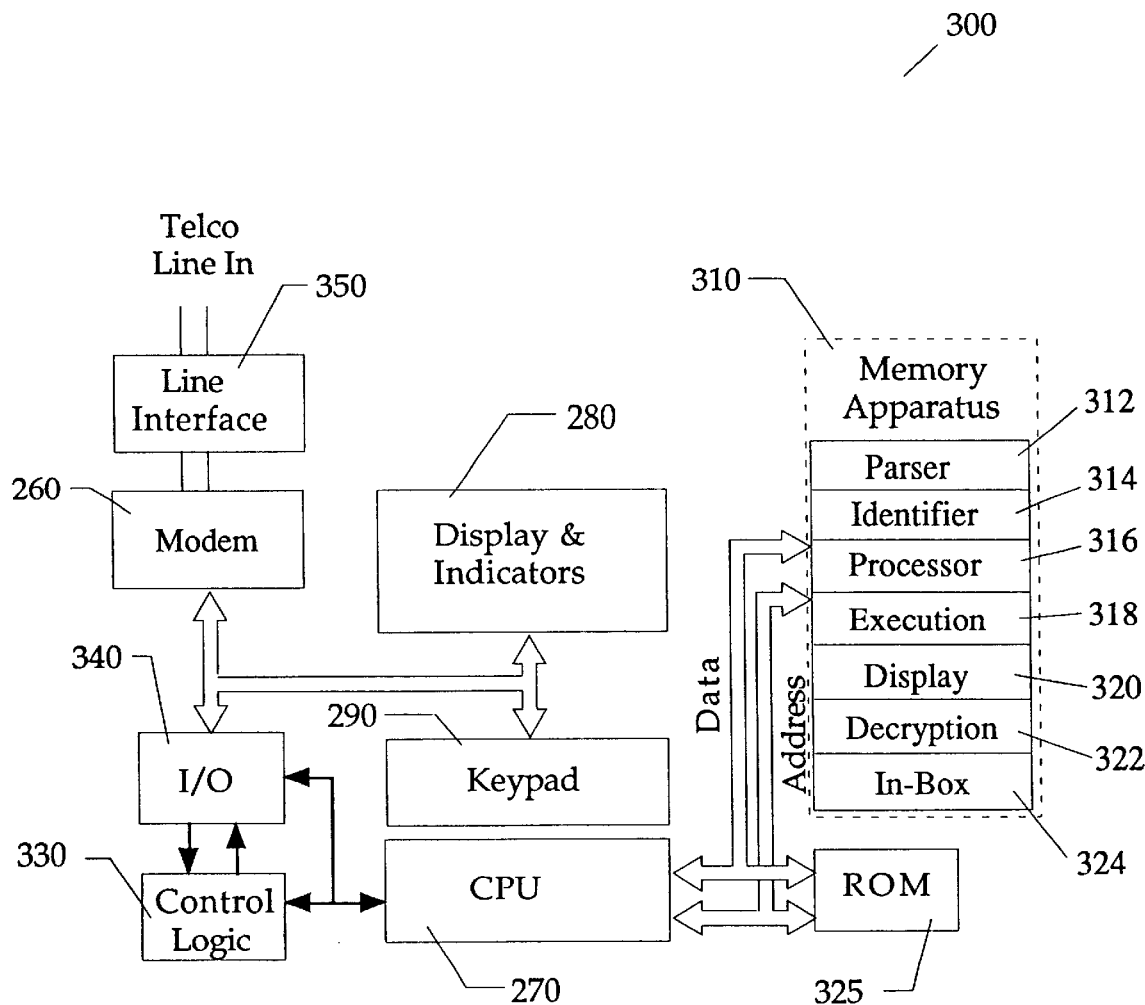
FIG. 3 illustrates a remote Desktop E-mail Terminal (DET) including a memory apparatus that may be utilized in accordance with one embodiment of the present invention.

Referring now to FIG. 3, a detailed block diagram 300 of the premises DET device 150 suitable for use with the method of the present invention is shown. The device contains a line interface 350 that isolates the public telephone lines and provides proper impedance matching. The modem 260 is of the type well understood by those skilled in the art and accomplishes the sending and receiving of data. Input/Output (I/O) function 340 provides the proper interface from the various devices external to the CPU such as the keypad 290 and the display/indicators 280. In the preferred embodiment of the present invention, the display is 320 by 128 pixels, but, as is known to those skilled in the art, other display sizes are possible without departing from the spirit of the invention. Similarly, the keypad in the preferred embodiment is of the QWERTY type well known to those skilled in the art, but other types of keypads or input devices could also be used without departing from the spirit of the invention.

The CPU 270 provides all command and control for the premises DET 150. Control of the I/O devices is accomplished through the control logic 330. Also connected via busses to the CPU are Read Only Tremors (ROM) 325 containing power on and initialization code and Random Access Memory (RAM) 310 which stores the program, incoming e-mail messages, user selectable records and all variables. Also contained in RAM 310 are the parser module 321, identifier module 314, processor module 316, execution module 318, display module 320, decryption module 322 and the e-mail in-box area 324. Together these modules form the memory apparatus that enable the method of the present invention.

In the preferred embodiment of the present invention the CPU 270 is a custom Application Specific Integrated Circuit (ASIC) based upon Z80 architecture from Zilog Corporation of Campbell, Calif., but containing other logic and support circuitry in addition to the control processor. In operation, the premises DET 150 is driven in an interrupt manner similar to digital devices well understood by those skilled in the art. Note that while the current embodiment of the present invention is described by the above details, as is known to those skilled in the art, it is no: the only possible embodiment, thus the scope of the invention is limited only by the claims.

Figure 4:
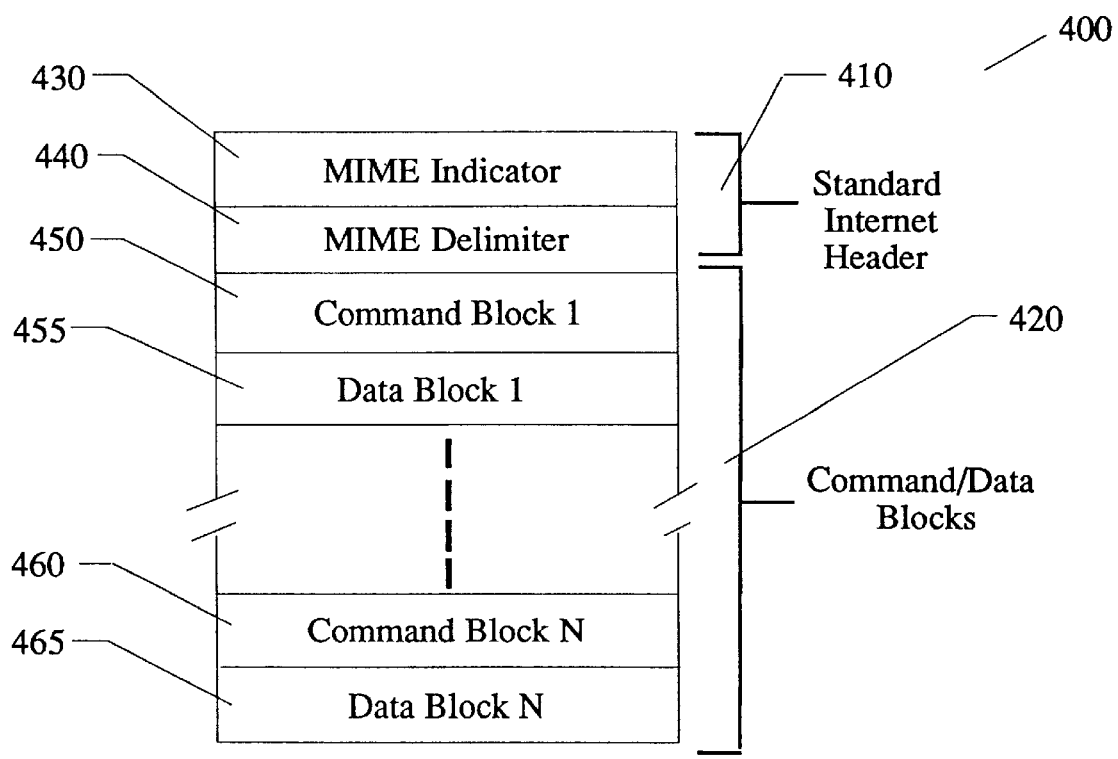
FIG. 4 illustrates an embedded data message format that may be utilized in accordance with one embodiment of the present invention.

Looking now at FIG. 4, the general composition of an e-mail message 400 generated by the method of the present invention is shown. The e-mail message is comprised of two parts: a standard Internet message header 410 and a series of message segments 420 which may be either command or data blocks. Note that although it is possible to have zero message segments, there is in practice at least one. Each of these two general message parts will be discussed in greater detail below.

As noted above, the standard Internet e-mail message header 410 complies with the MIME specification RFC-2045 and contains a MIME indicator 430, and a MIME delimiter 440, both of which will be discussed in detail below. The message segments consist of command blocks, for example 450 and 460, or data blocks such as 455 and 465. These command or data blocks may take the form of at least five different data types discussed in detail below. Each of the segments is delimited by an arbitrary MIME boundary segment indicator and a data type statement, such that the premises DET 150 may react appropriately to the specific commands or data contained in the incoming e-mail message segments. While there is no upper limit to the number of segments permitted in a given e-mail message, in practice the number of segments is small.

Note that to provide clarity for the reader, throughout the balance of the detailed description of the preferred embodiment of the present invention the recipient premises DET 150 will be referred to simply as the DET, an e-mail message simply as the message, and the e-mail message recipient simply as the user. Other names could be used to describe other embodiments, thus, as will be apparent to those of skill in the art, the scope of the invention is limited only by the claims.

As discussed above, the method of the present invention proceeds from a sender's location where a message is formatted through a transmission medium to the user's location where a digital device responds to the message. Referring again to FIG. 2, the header former module 222 composes a standard MIME message header, including a segment boundary indicator. The command formatter module 220 accepts the output of an editor 210, whether a GUI as is the case for the preferred embodiment or a non-graphical editor, processes the editor output using a custom set of commands described in detail below, and generates command or data blocks representing diverse data types. The e-mail combiner module 224 then combines the message header and the command or data blocks in such a way as to separate the header and each of the blocks by the segment boundary indicator.

Preferably, the e-mail combiner module 224 creates a security key block, again separated by the segment boundary indicator. This security key is used by the user's DET to validate the incoming message. It will be recognized by those skilled in the art that this security key is not necessary for embedding diverse data types in an e-mail message, thus it is possible to make use of the invention without the presence of a security key.

Referring back to FIG. 3, the message is received by the DET in the normal fashion. Once received, the message resides in DET RAM 310. When the user retrieves the message from the in-box 324, the decryption module 322 validates the message, the parser module 312 separates the message into command or data blocks, the identifier module 314 determines what type of diverse data is contained in the blocks, the processor module 316 interprets the text in the parsed blocks and the execution module 318 acts upon the digital device in a manner consistent with the commands or data contained in the blocks. Depending on the nature of the commands or data contained in the parsed blocks, the message may or may not be displayed by display module 320 as described in greater detail below.

FIG. 5 provides the details of the types of data that may appear in a command or data block. The five types are x-clipmail/text, x-clipmail/x-bitmap, x-clipmail/x-binary, x-clipmail/x-form and text/plain. Each of the command block segments (450 through 465 of FIG. 4) of a message may contain only one type of data, but there may be more than one command or data block of the same data type in a given message. For example, a message may have four segments: the first containing data type x-clipmail/text, the second containing data type x-clipmail/x-bitmap, the third containing another block of data type x-clipmail/text, and the fourth containing data type text/plain. In this example there are two segments containing the data type x-clipmail/text which contain DET commands as described below, a singe bit-mapped graphic segment, and a final text segment that is user readable.

The presence of the data type text/plain in the fourth segment of the message example above provides two important functions. First, it insures that the message title appearing in the in-box of the user's DET indicates the purpose of the message. This provides the user the opportunity to discard the message prior to opening. If the user discards the message without opening it, the embedded commands will not execute thereby providing a failsafe for the user. Thus another advantage of the present invention is the ability to provide a positive failsafe that allows the user to determine if they wish to have embedded DET commands executed.

If the user opens the message the embedded commands will execute. At the same time, a text message is displayed on the DET screen with a detailed explanation of what the embedded commands have accomplished. An example is making a change to an account or adding a new user to an existing account. Prior to closing the e-mail session, the DET automatically generates and sends a return e-mail message confirming that the embedded DET commands have been executed properly. Thus, the second purpose of the data type text/plain is to provide a text message to the user at the time of execution of the embedded DET commands.

If data of the type text/plain is not present in an incoming message, and if the balance of the message contains DET commands as explained in further detail below, the commands will execute without user intervention. By having the ability to execute commands on the user's DET from a remote location, such tasks as updating code revisions, verifying user serial numbers, or providing the user with correct date and time information are possible. As was the case with the user acknowledged message, once the commands have properly executed, the DET automatically sends a return message to the sender to verify that execution has occurred. Only upon receiving the return confirmation does the sender know that the commands have executed properly. Thus, a further advantage of the present invention is the ability to remotely interrogate the user's DET and execute commands on the DET without the user's knowledge or the need for user intervention.

Data type x-clipmail/text identifies an e-mail message segment containing DET commands, such as those listed in FIG. 6 through FIG. 9. When an e-mail message segment is identified with this data type, all data contained in the section are interpreted as commands. The DET will respond to each command as described in detail below.

Data type x-clipmail/x-bitmap identifies an e-mail message segment containing a graphic image to be displayed on the DET screen. When an e-mail message segment is identified with this data type, all data contained in the section are interpreted as a bitmapped graphic that has been encoded using the base64 MIME standard. The DET will display the data on the screen for the user to view.

Data type x-clipmail/x-binary identifies an e-mail message segment containing binary code to be executed by the DET. When an e-mail message segment is identified with this data type, all data contained in the section represent a program or function. The DET will store the code in DET memory for later execution by the user. Once resident in the DETs memory, the program or function remains available for use. Note that although the common practice for this type of data is to send a small program or function, it should be recognized to those skilled in the art that complete, extensive programs or functions may also be sent using the method of the present invention.

Data type x-clipmail/x-form identifies an e-mail message segment containing an electronic form to be displayed on the DET. When an e-mail message segment is identified with this data type, the form will be displayed on the DET screen and the user has the ability to interact with it. Once the form is completed, the user may instruct the DET to submit the form as a normal text/plain MIME outgoing e-mail message. Alternatively, a form bitmap data block may be downloaded to the user's in-box containing a standard set of soft keys, field definition commands supporting field labels and parameters, check-box field support, and a mechanism for gathering, compiling and placing the completed form in the user's out-box. By way of example, this type of embedded diverse data may be used for electronic banking or electronic commerce.

Data type text/plain identifies an e-mail message segment containing standard text. When an e-mail message segment is identified with this data type, the data contained in the segment will appear as a normal e-mail message to the user. The user may then read, reply, file or manipulate the e-mail message as a normal text message. While the five types of data described above represent the types in the current embodiment of the present invention, it will be understood by those skilled in the art that these are not the only possible types of diverse data that may be embedded in an e-mail message without departing from the concepts disclosed by the invention.

As was noted briefly above, an e-mail message segment identified as containing data type x-clipmail/text identifies an e-mail message segment containing DET commands. There are four groups of DET commands that may appear in such a command block. These are Global commands, Internet commands, Address Book commands and Calendar commands. The precise form, syntax and function of these commands are presented in FIG. 6 through FIG. 9, however, a brief description of each follows.

Starting with FIG. 6, the Global commands consist of SET_ACTIVE_USER, SET_DATE, SET_TIME, GLOBAL_COLOR_TABLE, DET_VERS_REQUIRE, EXPIRE_DATE, and SECURITY_KEY. The SET_ACTIVE_USER command selects an active e-mail account and is used to isolate a particular account among many accounts that have been targeted by a single command block. Thus, if all DETs associated with a group of users are to receive an updated date and time, a single command block may be used and the SET_ACTIVE_USER command identifies each account serially for the update.

The SET_DATE and SET_TIME commands allow the message originator to deliver the current time and date to the DET to synchronize activities. The GLOBAL_COLOR_TABLE command sets the color table to be used by the DET in displaying graphic images and text on the DET screen. The DET_VERS_REQUIRE sets a minimum threshold requirement for the software residing in the receiving device. For example, by indicating "2.0", devices having the "1.0" version of the DET operating program would not attempt to interpret the block. The EXPIRE_DATE command sets the date at which a received message will expire, and the SECURITY_KEY command is a random security code generated and sent by the message originator.

Looking now at FIG. 7, the Internet Commands consist of SET_USER_NAME, SET_EMAIL_ACCOUNT, DELETE_EMAIL_ACCOUNT, SET_EMAIL_PASSWORD, SET_EMAIL_SERVER, SET_SMTP_SERVER, SET_ISP_ACCOUNT, SET_ISP_PASSWORD, SET_DNS_SERVER, and SET_DIAL_NUMBER. The SET_USER_NAME command sets the username of the DET terminal. The SET_EMAIL_ACCOUNT command sets the users account number and, in a like manner, the DELETE_EMAIL_ACCOUNT command deletes the user's account number. The SET_EMAIL_PASSWORD command sets the user's password for the given e-mail account. The SET_EMAIL_SERVER command sets the POP3 server to be used for e-mail coming in to the DET terminal. The SET_SMTP_SERVER sets the server that handles outbound e-mail from the user's DET terminal, while the SET_DNS_SERVER command sets the DNS server field in the user settings record. The SET_ISP_ACCOUNT, and SET_ISP_PASSWORD commands set the user's Internet Service Provider [ISP] Point to Point Protocol [PPP] account information in DET device memory. The SET_DIAL_NUMBER command sets the service provider's dial-up phone number to be used by the DET device. It should be noted that while the above commands represent those used in the current embodiment of the present invention, it will be obvious to those skilled in the art that these are not the only possible Internet commands that may be embedded in an e-mail message.

FIG. 8 provides detailed information on the three Address Book commands. The NEW_ADDRESS_ENTRY command allows the user to add an address to the address book in the DET memory, or to modify an address that is already present. The NEW_GROUP_ENTRY command allows the user to add a new group) address to the address book in DET memory. After creating a new group, the user can subsequently edit the group membership. For example, a new member may be added to the group using the Group field within the new user record to associate the member with a group. The command may also be used to synchronize the DET address book entries with those of a desktop PC. Note that while the above commands represent those used in the current embodiment of the present invention, it will be understood by those skilled in the art that these are not the only possible Internet commands that may be embedded in an e-mail message.

In FIG. 9, the NEW_CALENDAR_ENTRY command is shown. This command permits the user to enter an appointment in the area of DET memory reserved for the calendar. It should be noted that while the commands described above in FIG. 6 through FIG. 9 represent those used in the current embodiment of the present invention, it will be obvious to those skilled in the art that these are not the only possible types of commands that may be embedded in an e-mail message without departing from the spirit of the invention.

Recalling that there are five data types that may be embedded in an e-mail message segment, FIG. 10 provides the details of the commands related to data type x-clipmail/x-bitmap. The four commands for data type x-clipmail/x-bitmap are:

BITMAP_RECT, BITMAP_STORE, BITMAP$_{13}$ DEPTH and

BITMAP_COLOR_TABLE, BITMAP_STORE_ICON.

The BITMAP_RECT command sets the screen location and image size for the DET screen. The BITMAP_STORE command sets one of several predefined storage options. By enumerating a list of storage options in the DET, it is possible to transmit bitmaps and view them in different parts of the user interface. For example, in the preferred embodiment of the present invention, storage location 1=InBox (a message viewed in the InBox), 2=Start Screen (the massage the user sees upon power up), 3=Main Menu (the banner that appears above the main menu icons) and, 4=Extras (information appearing on the screen of the DET). However, as is known to those skilled in the art, other storage locations or options are possible without departing from the spirit of the invention.

The BITMAP_DEPTH command indicates to the DET CPU the number of bits to be used to display each pixel on the DET screen. The BITMAP_COLOR_TABLE command sets the bitmapped color table to be used to display the embedded images received by the DET. Using a base64 bitmap encoding scheme the entire DET screen, or a portion of the screen, can be drawn. In single bit depth mode, each hexadecimal character represents eight pixels on the DET display.

In higher bit depth modes, each pixel has a BITDEPTH bit which is decoded into the color table stored in the DET. The BITMAP_ICON command is used in association whit the BITMAP_STORE command to store a new icon in the Extras section of DET memory. For example, in icon representing a weather forecast could be downloaded into the Extras section of DET memory. When the user selects the icon, a weather forecast will appear on the DET screen. The bitmap commands just described are exemplary in nature and represent those used in the current embodiment of the present invention, however, it will be obvious to those skilled in the art that these are not the only possible bitmap commands that may be embedded in an e-mail message.

Also available for embedding in an e-mail message are the Form commands, of data type x-clipmail/x-form, shown in detail in FIG. 11. The seven commands in this data type are: FORMNAME, SUBJECT, REPLY-TO, TEXT, CHECK_BOX, FILED and POPUP_MENU. The FORMNAME command identities the type of form that is to be displayed on the DET screen for the user to complete. The SUBJECT command defines how the outgoing e-mail response from the user will appear in the outbox and may also provide a key word to quickly identify the e-mail message. The REPLY-TO command defines e-mail address that the outgoing e-mail message is to be sent to. The TEXT command provides the actual text to be read by the user on the form appearing on the DET screen. The CHECK_BOX command indicates where a check-box is to be drawn on the form being displayed on the DET screen. The FIELD command indicates the size and location of an input data field to be completed by the user of the DET. The POPUP_MENU command provides a menu of choices for the user to select from using navigation keys on the DET keypad. The form commands just described are exemplary in nature and represent those used in the current embodiment of the present invention, however, it will be obvious to those skilled in the art that these are not the only possible Form commands that may be embedded in an e-mail message.

As previously stated, the method of the present invention proceeds from a sender's location where a message is formatted through some form of transmission medium to the user's location where a digital device interprets and responds to the message. The process of embedding diverse data in an e-mail message as explained above results in a received text file such as 400 in FIG. 12, comprised of two main parts: the MIME header 410 and zero or more command segments 450.

The MIME header 410 is comprised of a From line 415, a To line 420, a Date line 425, a Subject line 430, a MIME-Version line 435 and a Content line 440. Together the lines forming the header 410 conform to the standard set by MIME format RFC-2045 through 2049. Those of skill in the art will recognize that use of the MIME standard header is not the only message header format that may be used by the method of the present invention. Other message header formats may be used without departing from the spirit of the invention.

Following the header are the command segments, each of which is delimited by an arbitrary MIME boundary segment indicator such as 460 which identifies a new segment boundary. In the exemplary e-mail message shown, this line is defined as "—new_segment." Note that the exact content of the boundary segment indicator may be determined by the sender of the e-mail message, thus the segment indicator described is exemplary only and other segment indicators may be used without departing from the spirit of the present invention. Following this segment indicator is a data type content line 463. In the example the first command segment defines the data type to be x-clipmail/text using plain text and a U. S. ASCII character set. Also in this first segment is the global security code verification command SECURITY_KEY with an example of a typical security key in line 466.

The security key is used for two purposes: to guarantee to the user that the server delivering the e-mail message can be trusted, and to allow the exchange of sensitive information over the network. Examples of the type of sensitive information which might be sent are credit card numbers and bank account data, however, it will be clear to those of skill in the art that this is not the only type of information that can benefit from the security method of the present invention.

The security key is generated by encrypting a character string at the sender's location and subsequently decrypting the string at the user's location so that information transferred across a network may be received with reasonable confidence that the information is secure. The encryption/decryption of the character string is based on the Data Encryption Standard (DES) using a variation known as Simple DES (SDES) to speed computation of the key and to accommodate the eight bit device in the user's DET.

In an authenticated e-mail message, the security key will appear following the X-CLIPMAIL-SECURITY_KEY: command in the MIME header section of the message, as in line 466 in FIG. 12. The key is composed of a validity string of 24 characters and a key string of 8 characters. Both the validity string and the key string are encrypted.

Upon receipt of an e-mail message at the DET, all information in the security key, including both the validity string and the key string, must decrypt exactly in order to authenticate the message. If the e-mail message fails to decrypt properly, the user notifies the service provider that a forgery has been received. If the DET receives more than three improperly decrypted e-mail messages within a 24 hour period, the device will refuse to receive further messages until an additional 24 hour period has lapsed. In this way the present invention provides the advantage of reasonably secure transactions over a public network. A further advantage of the security key is that it provides a barrier to unwanted messages, such as so called "spam" e-mail.

Line 469 begins the command or commands that are to be interpreted by the DET. These commands may be Global, Internet, Address Book or Calendar commands as previously discussed in detail above an defined in FIG. 6 through FIG. 9. Recall that at this point in the process, the parser module 312 of FIG. 3 has parsed the incoming message into segments and the identifier module 314 of FIG. 3 has identified the type of data contained in each of the segments. Thus, the processor module 316 of FIG. 3 now interprets the custom commands and the execution module 318 of FIG. 3 causes the commands to be executed upon the digital device, in this embodiment, the user's DET.

Following line 469 in FIG. 12 is a new segment delimiting line 460 signifying the beginning of a new command segment. In the example shown, the data type content line 470 indicates that this segment contains an image of data type x-clipmail/x-bitmap. Following the data type statement is line 472 that contains the command that sets the display screen location and size of the image to be displayed followed by line 473 that containing further Bitmap commands as discussed in detail above and defined in FIG. 10.

Following the bitmap command segment is again a new segment delimiting line 460. This time the data type content defined in line 476 is x-clipmail/x-form. However, note in this segment that the Form commands appear as defined in FIG. 11. Line 479 is the FORMNAME command, line 483 the SUBJECT command, line 486 contains the REPLY-TO command, and lines 489, 490 aid 492 have FIELD commands with associated field text. Note that it is not required that all commands of a specific command set be present to make use of the method of the present invention.

In the example of FIG. 12, a last segment delimiting line 460 begins the last command segment of the e-mail message. Line 494 defines the data type contents as text/plain. Lines following this content definition, such as line 196, will be ordinary ASCII text visible to the user as a standard e-mail message. Recall that since data of this type are present, the DET device will not automatically execute any commands embedded in other e-mail message segments until the user takes some action.

Use of the method of the present invention allows a remote device, such as the DET in this embodiment, to interpret diverse data embedded in a standard e-mail message. The invention accomplishes the interpretation by first parsing electronic mail message into segments, then identifying diverse data types within said segments, processing the data identified within the segments, and finally executing the appropriate tasks related to the embedded data upon the remote device. Depending on the exact type of data contained in the e-mail message segments, the user's device may or may not require user interaction and may or may not display the content of the message to the user.

Those of skill in the art will recognize that the present invention also provides a method for updating a remote device. Remote updating of a device is accomplished by the invention by combining the method for embedding diverse data in an e-mail message with the method for interpreting the diverse embedded data, both of which have been described in detail above. Implementation of the method for updating a remote device consists of first generating a standard e-mail message containing the required diverse data, then retrieving the message and storing it in a memory apparatus in the receiving device at the user's location, next parsing the message into segments, identifying the data in the message segments representing the desired update, and then executing the update in accordance with the data. As explained in detail above, the user may or may not be required to interact with the device depending on the type of data contained in the message.

A first advantage of the present in invention is the ability to embed diverse data types in a standard, network compliant e-mail message. This ability greatly reduces the need for special equipment and the expense associated with such specialized equipment.

A second advantage of the present invention is the ability of a remote device to interpret diverse data types contained in a standard e-mail message. Use of custom command sets representing diverse data types provides the further advantage of delivering the data to many different types of remote devices.

A third advantage of the present invent ion is the protection provided by the security, key. The inclusion of this encrypted key as an embedded data type in a standard e-mail message allows the user to be reasonably certain that data sent are secure and acts as a protection against unwanted e-mail deliveries.

A fourth advantage of the present invention is the ability to remotely manage a user's device via a standard e-mail message. For the preferred embodiment, the device is a desktop e-mail terminal, or DET. Functions managed in the remote device include account information, security verification, date and time control, and others as described above. But it should be obvious to those skilled in the art that this is not the only type of device that may be controlled using the method of the present invention, nor are the functions managed limited to those described.

A fifth advantage of the present invention is the ability to download bitmapped images using a standard e-mail message. Such bitmapped images may, contain advertisements, icons, or other graphical information that man be presented to the user of the remote device.

A sixth advantage of the present invention is the ability to provide interactive forms to the user of the remote device via a standard e-mail message. By presenting a form that may be viewed and manipulated by the user, rapid and accurate responses to questionnaires, surveys, accounting records, and the like may be secured.

A seventh advantage of the present invention is the ability to download binary code for execution by the remote device using a standard e-mail message. The exact code may be tailored to any target CPU without modification to the method of the invention. Simple functions or programs are the norin, but it should be obvious to those skilled in the art that complete complex programs may be sent using the method of the present invention.

While the above detailed description provides exemplary details of the preferred embodiment of the present invention, it will be clear to those skilled in the art that other embodiments are possible without departing from the concepts disclosed by the present invention, thus the scope of the invention is limited only by the claims.

What is claimed is:

1. A method for remotely managing a remote device using an electronic mail message, said method comprising:

forming a network compliant electronic mail message header;

generating at least one command configured to be automatically executed by a remote device;

combining said at least one command with said network compliant electronic mail message header into an electronic mail message;

insuring that said electronic mail message conforms to network standards such that said at least one command is processed as textual information; and sending the electronic mail message to a specified electronic mailbox in a mail server for storage in the mail server at least until the remote device logs onto the mail server for an e-mail session, such that in use once said electronic mail message is received by said remote device, said at least one command is automatically executed, without user intervention, to remotely manage said remote device.

2. The method of claim 1 wherein said generating step further comprises utilizing a custom set of formatting commands.

3. The method of claim 2 wherein said generating step includes utilizing a custom set of formatting commands selected from a group including receiver apparatus executable commands, receiver apparatus program code commands, receiver apparatus graphical image data commands, receiver apparatus interactive user forms commands, and plain text commands.

4. The method of claim 2 wherein said generating step includes utilizing a custom set of formatting commands selected from a group including Desktop E-mail Terminal (DET) executable commands, DET program code commands, DET graphical image data commands, DET interactive user form commands, and plain text commands.

5. A method for remotely managing a remote device using an electronic mail message, said method comprising:

composing a standard Multipurpose Internet Mail Extensions (MIME) header wherein a segment boundary is defined;

generating command blocks configured to be automatically executed on a remote device;

separating a selected command block from said command blocks with said segment boundary, combining said standard MIME header and said selected command block into a standard MIME electronic mail message; and sending the electronic mail message to a specified electronic mailbox in a mail server for storage in the mail server at least until the remote device logs onto the mail server for an e-mail session, such that in use once said electronic mail message is received by said remote device, said selected command block is automatically executed, without user intervention, to remotely manage said remote device.

6. The method of claim 5 wherein said generating step further includes the steps of:

generating a first command block representing one or more receiver apparatus executable commands;

generating a second command block representing one or more receiver apparatus user form commands;

generating a third command block representing one or more receiver apparatus graphical image commands;

generating a fourth command block representing program code commands; and generating a fifth command block representing plain text commands.

7. The method recited in claim 5 further comprising the steps of:

producing an electronic mail message security code, said producing step including the steps of:

encrypting a character string representing an electronic mail message security code within an electronic mail message for remotely managing a remote device; and inserting said encrypted character string as a standard MIME segment in said electronic mail message.

8. The method recited in claim 7 further comprising the steps of:

using the Simple Data Encryption Standard (SDES) encryption method, said using step including the steps of:

encrypting a twenty-four character validation string; and further encrypting an eight character key string.

9. A digital device comprising:

means for logging into a specified electronic mailbox in a mail server for an e-mail session and receiving an electronic mail message stored in the mail server;

a parsing module to parse the electronic mail message into segments;

a data type identification module to identify diverse data types within said segments;

a processing module to process said segments as textual information;

an execution module to automatically execute commands contained in said segments so as to manage the digital device, where said execution module is invoked once said electronic mail message has been received by said digital device; and a display module to facilitate the display of said electronic mail message.

10. The memory of claim 9 further comprising a decryption module to decrypt an electronic mail message security code.

11. The memory of claim 10 wherein said decryption module includes executable instructions to:

decrypt a twenty-four character validation string;

decrypt an eight character key string; and determine that the security code is valid.

12. A method for automatically executing embedded commands in an electronic mail message executed by a digital device under the control of a program, said method comprising:

the digital device logging into a mail server for an e-mail session and receiving an electronic mail message from a specified electronic mailbox in the mail server that was previously sent to the electronic mailbox for storage;

parsing the electronic mail message into segments;

identifying diverse data types within said segments;

processing said segments as textual information;

executing commands contained within said segments to manage the digital device, where said executing occurs automatically, without user intervention, once said electronic mail message has been received by said digital device; and displaying said electronic mail message.

13. The method of claim 1, wherein said combining step further comprises aggregating diverse data into said electronic mail message, such that in use automatic execution of said at least one command presents said diverse data in a manner defined by said commands.

14. The method of claim 5, wherein said combining step further comprises aggregating diverse data into said electronic mail message, such that in use automatic execution of said selected command block presents said diverse data in a manner defined by said command blocks.

15. The memory of claim 9, wherein said execution module automatically executes commands contained in said segments so as to present said diverse data types in a manner defined by said commands.

16. The method of claim 12, wherein said executing step further comprises automatically executing commands contained in said segments so as to present said diverse data types in a manner defined by said commands.

* * * * *